(12) United States Patent
Terekhov et al.

(10) Patent No.: US 8,092,573 B2
(45) Date of Patent: Jan. 10, 2012

(54) PURIFICATION OF PGM SPECIES FROM MIXTURES THEREOF

(75) Inventors: Dmitri Terekhov, Newmarket (CA); Nanthakumar Victor-Emmanuel, Richmond Hill (CA); Olujide Olurin, Bohwood (CA); Kamran Khozan, Dubai (AE)

(73) Assignee: CVMR Corporation, Toronto (CA)

( * ) Notice: Subject to any disclaimer, the term of this patent is extended or adjusted under 35 U.S.C. 154(b) by 89 days.

(21) Appl. No.: 12/373,438

(22) PCT Filed: Jun. 28, 2007

(86) PCT No.: PCT/CA2007/001155
§ 371 (c)(1),
(2), (4) Date: Oct. 19, 2009

(87) PCT Pub. No.: WO2008/006194
PCT Pub. Date: Jan. 17, 2008

(65) Prior Publication Data
US 2010/0043598 A1 Feb. 25, 2010

(30) Foreign Application Priority Data
Jul. 12, 2006 (CA) .................................... 2552292

(51) Int. Cl.
*C22B 3/44* (2006.01)
*C22B 11/00* (2006.01)

(52) U.S. Cl. .......... 75/413; 423/22; 423/240 R; 423/246

(58) Field of Classification Search .............. 423/240 R, 423/246, 22; 75/413
See application file for complete search history.

(56) References Cited

U.S. PATENT DOCUMENTS

| | | | |
|---|---|---|---|
| 3,823,220 A * | 7/1974 | Vasku | 423/22 |
| 6,596,245 B2 | 7/2003 | Fachinetti et al. | |
| 2001/0025548 A1 * | 10/2001 | Fachinett et al. | 75/426 |
| 2010/0257978 A1 * | 10/2010 | Bergeron et al. | 75/631 |

FOREIGN PATENT DOCUMENTS

| | | |
|---|---|---|
| CA | 2411796 A1 | 5/2004 |
| GB | 250726 | 4/1926 |

(Continued)

OTHER PUBLICATIONS

Kim et al. "Recovery of Platinum-Group Metals from Recycled Automotive Catalytic Converters by Carbochlorination." Ind. Eng. Chem. Res. 2000, 39 (1185-1192).*

(Continued)

*Primary Examiner* — George Wyszomierski
*Assistant Examiner* — Tima M McGuthry Banks
(74) *Attorney, Agent, or Firm* — Osha · Liang LLP

(57) ABSTRACT

A process for the production of a purified PGM selected from the group consisting of platinum and rhodium from an impure PGM source, the process comprising (a) obtaining an anhydrous PGM halide from the impure PGM source; (b) treating the PGM halide with carbon monoxide at an effective temperature; pressure and time to form the PGM carbonyl halide; and (c) (i) wherein the PGM is platinum, heating the platinum carbonyl halide at an effective platinum decomposition temperature to produce the purified platinum; (ii) wherein the PGM is rhodium, heating the rhodium halide at an effective rhodium decomposition temperature to produce the purified rhodium; and (iii) wherein the platinum carbonyl carbonyl halide and the rhodium carbonyl halide are in a gaseous mixture, effecting step (i) at a temperature lower than the rhodium effective decomposition temperature prior to effecting step (ii). The process is of particular value in the recovery and recycle of PGM materials from vehicle exhaust catalytic converters.

15 Claims, 1 Drawing Sheet

FOREIGN PATENT DOCUMENTS

JP 63-243228 A 10/1988
WO WO 02/053788 A1 * 7/2002

OTHER PUBLICATIONS

International Search Report from PCT/CA2007/001155 dated Oct. 23, 2007 (3 pages).

Written Opinion from PCT/CA2007/001155 dated Oct. 23, 2007 (6 pages).

espacenet.com Abstract of JP63243228A; Publication Date Oct. 11, 1988; Tanaka Precious Metal Ind. (1 page).

International Preliminary Report on Patentability from PCT/CA2007/001155 dated Oct. 10, 2008 (13 pages).

* cited by examiner

PURIFICATION OF PGM SPECIES FROM MIXTURES THEREOF

This application is a national stage entry of PCT/CA07/01155, filed Jun. 6, 2007.

Receipt is acknowledged of papers submitted under 35 U.S.C. 119(a)-(d), which papers have been placed of record in the file.

FIELD OF THE INVENTION

This invention relates to apparatus for and process of purification of metals from compounds and mixtures thereof, particularly, the extraction and separation of individual metals of the group defined herein as the platinum group of metals (PGMs) from the metals per se and materials comprising the metals, such as ore, slag, scrap, slurry concentrate, metallurgical intermediates, by-products and the like by the formation, separation and decomposition of volatile compounds comprising the metals.

BACKGROUND TO THE INVENTION

By the term "platinum group metal" (PGM) as used in this specification and claims is meant a metal selected from the group consisting of platinum, palladium, rhodium, osmium, ruthenium, iridium and rhenium.

By the term "PGM species" or "species" in this specification is meant the metal per se, compounds thereof, or cations or complexed anions thereof in aqueous solution.

Some of these PGMs are known to form volatile complexes of PGM halogens with carbon monoxide having a relatively high vapour pressure and relatively low decomposition temperature, which makes them suitable for a subsequent thermal decomposition process to produce the purified metal per se. Others are known to be difficult to synthesis or have extremely high temperatures of decomposition of the order of 600° C.

Although, volatile individual PGM carbonyl halide complexes are known to be formed and decomposed thermally to produce the pure metal, it is not known whether such processes are applicable when a plurality of PGMs are present together in varying degrees as from various species, in such materials as, for example, ore, slag, scrap, slurry, concentrate, metallic intermediates, metals per se by-products and the like. This uncertainty is enhanced when other non-PGMs, such as, for example, Ni, Co, Fe, Cr, Mo, Mn and W are present and known to form complexes, such as, for example, with carbon monoxide and especially when some notably, Ni, Fe and Co are volatile with practical vapour pressures and thermally decomposable.

It is known also, that PGMs do not always react with an aforesaid gaseous reactant to a sufficient extent in a satisfactory manner.

SUMMARY OF THE INVENTION

It is an object of the present invention to separate a platinum species from a palladium species in a mixture of said species.

It is a further object to separate a rhodium species from an iridium species in a mixture of said species.

It is a further object to separate a platinum species and a rhodium species from a palladium species and an iridium species in a mixture comprising said species.

It is a further object to separate a platinum species from a rhodium species in a mixture comprising said species.

It is a further object to produce platinum metal and rhodium metal free of each other metal from a mixture comprising PGM species selected from platinum, palladium, rhodium and iridium.

Accordingly, in one aspect, the invention provides a process for the production of a purified PGM selected from the group consisting of platinum and rhodium from an impure PGM source, said process comprising (a) obtaining an anhydrous PGM halide from said impure PGM source;

(b) treating said PGM halide with carbon monoxide at an effective temperature; pressure and time to form said PGM carbonyl halide; and (c) (i) wherein said PGM is platinum, heating said platinum carbonyl halide at an effective platinum decomposition temperature to produce said purified platinum;

(ii) wherein said PGM is rhodium, heating said rhodium halide at an effective rhodium decomposition temperature to produce said purified rhodium; and (iii) wherein said platinum carbonyl halide and said rhodium carbonyl halide are in a gaseous mixture, effecting step (i) at a temperature lower than said rhodium effective decomposition temperature prior to effecting step (ii).

In a further aspect, the invention provides a process of separating a platinum species from a palladium species in a species mixture comprising said platinum species and said palladium species, said process comprising (a) obtaining an anhydrous admixture comprising a platinum halide and a palladium halide from said species mixture;

(b) treating said admixture with carbon monoxide at an effective temperature, pressure and time to produce a platinum carbonyl halide and a residue; and (c) collecting said platinum carbonyl halide.

In a further aspect, the invention provides a process of separating a rhodium species from an iridium species in a species mixture comprising said rhodium species and said iridium species, said process comprising (a) obtaining an anhydrous admixture comprising a rhodium halide and an iridium halide from said species mixture;

(b) treating said admixture with carbon monoxide at an effective temperature, pressure and time to produce a rhodium carbonyl halide and a residue; and (c) collecting said rhodium carbonyl halide.

In a further aspect, the invention provides a process of separating a platinum species and a rhodium species from a palladium species and an iridium species in a species mixture comprising said platinum, palladium, rhodium and iridium species, said process comprising (a) obtaining an anhydrous admixture comprising a platinum halide, a palladium halide, a rhodium halide and an iridium halide from said species mixture;

(b) treating said mixtures with carbon monoxide at effective temperatures, pressures and time to produce platinum halide and rhodium halide and a residue; and (c) collecting said platinum carbonyl halide and said rhodium carbonyl halide gaseous mixture.

In a further aspect, the invention provides a process as hereinabove defined further comprising the steps of (i) heating said gaseous mixture at an effective platinum decomposition temperature, pressure and time to produce metallic platinum and a platinum-depleted gaseous mixture; and (ii) subsequently heating said platinum-depleted gaseous mixture at an effective rhodium decomposition temperature, pressure and time to produce metallic rhodium, wherein said platinum decomposition temperature is lower than said rhodium decomposition temperature.

In a further aspect, the invention provides a process as hereinabove defined wherein said impure PGM source further comprises an additional PGM selected from the group consisting of palladium and iridium.

In a further aspect, the invention provides a process as hereinabove defined wherein said anhydrous PGM halide is in admixture with an anhydrous additional PGM halide selected from the group consisting of palladium and iridium.

In a further aspect, the invention provides a process as hereinabove defined wherein said PGM halide is treated with carbon monoxide at a temperature selected from 80-150° C., a pressure of at least 1 bar and for at least 1 hr.

In a further aspect, the invention provides a process as hereinabove defined wherein said temperature is selected from 120-140°, pressure selected from 1-18 bar and for 2-25 hrs.

In a further aspect, the invention provides a process as hereinabove defined wherein said step (c) (ii) comprises heating said rhodium carbonyl halide in the presence of a chlorine scavenger.

In a further aspect, the invention provides a process as hereinabove defined comprising the step of heating said platinum carbonyl halide at an effective platinum decomposition temperature to produce metallic platinum.

In a further aspect, the invention provides a process hereinabove defined further comprising the step of heating said rhodium carbonyl halide at an effective rhodium decomposition temperature to produce metallic rhodium.

In a further aspect, the invention provides a process as hereinabove defined wherein said step of heating said rhodium carbonyl halide is effected in the presence of a chlorine scavenger.

In a further aspect, the invention provides a process as hereinabove defined wherein said scavenger is a metallic surface.

In a further aspect, the invention provides a process as hereinabove defined wherein said metallic surface comprises a copper or steel tube surface.

In a further aspect, the invention provides a process wherein said anhydrous PGM halide is a PGM chloride obtained by a process comprising the dissolution of said PGM species in aqua regia.

In a further aspect, the invention provides an apparatus for the production of a purified metallic PGM selected from the group consisting of platinum and rhodium said apparatus comprising
(a) a reactor for containing a PGM halide selected from platinum chloride and rhodium chloride;
(b) heating means for operably heating said PGM halide within said reactor;
(c) means for feeding carbon monoxide to said reactor;
(d) a decomposer means;
(e) heating means for heating said decomposer means; and
(f) means for operably transferring a PGM carbonyl halide from said reactor to said decomposer.

In a further aspect, the invention provides an apparatus as hereinabove defined wherein said decomposer means comprises a metallic surface.

In a further aspect, the invention provides an apparatus as hereinabove defined wherein said metallic surface comprises a surface formed of copper or stainless steel.

In a further aspect, the invention provides an apparatus as hereinabove defined wherein said decomposer means is formed of a non-chlorine scavenger material.

In a further aspect, the invention provides an apparatus as hereinabove defined wherein said non-chlorine scavenger material is a fluoroalkane plastics material.

In a further aspect, the invention provides an apparatus as hereinabove defined wherein said decomposer means further comprises a metallic surface.

In a further aspect, the invention provides an apparatus as hereinabove defined wherein said decomposer means (d) comprises a first decomposer and a second decomposer wherein said first decomposer is formed of a non-chlorine scavenger material and said second decomposer is formed of a chlorine scavenger material and wherein said first decomposer is located in series between said reactor and said second decomposer.

In a further aspect, the invention provides an apparatus as hereinabove defined wherein said first decomposer is formed of a perfluoroalkane polymer and said second decomposer comprises a metallic surface.

In a further aspect, the invention provides an apparatus as hereinabove defined wherein said metallic surface is selected from a copper surface and a steel surface.

In this specification, "halide" includes chloride, bromide and iodide.

Preferably, the halide is chloride.

By the term "chlorine scavenger material" in this specification is meant a material that reacts with the PGM carbonyl halide or catalyses the thermal decomposition of rhodium carbonyl chloride at a temperature of less than 250° C.

The invention is of particular value in the recovery and recycling of PGMs, particularly platinum and rhodium species from the catalyst mixtures of vehicle exhaust catalytic converters.

BRIEF DESCRIPTION OF THE DRAWINGS

In order that the invention may be better understood, preferred embodiments will now be described, by way of example only with reference to the accompanying drawings, wherein.

DETAILED DESCRIPTION OF PREFERRED EMBODIMENTS

Figure 1:
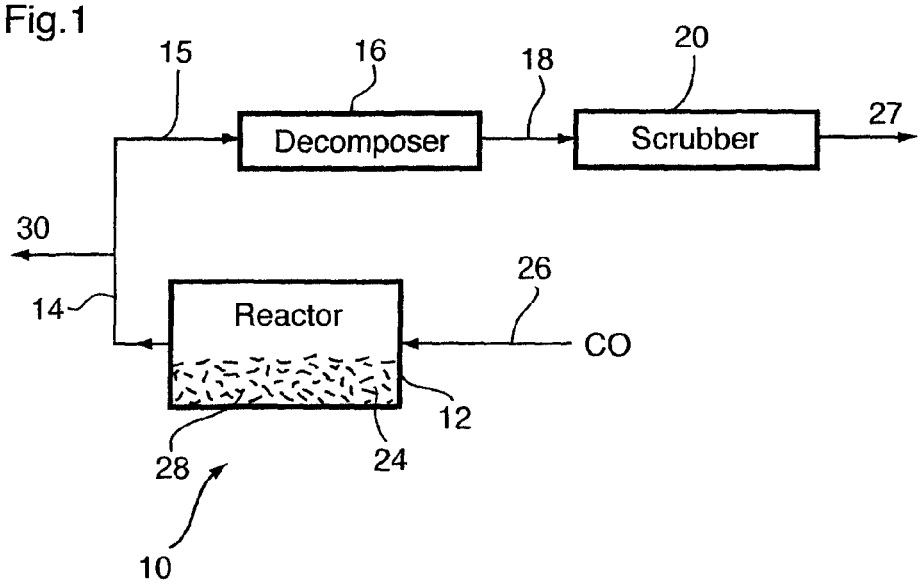
FIG. 1 is a diagrammatic representation of a carbonylation reactor and decomposer system and process according to the invention.

FIG. 1 shows generally as 10, a carbonylation reactor 12 connected by a conduit 14 to a PGM carbonyl halide tubular decomposer 16 formed of copper. Decomposer 16 is connected by conduit 18 to an ammonia scrubber 20. Reactor 12 contains an anhydrous mixture of a platinum and palladium chlorides 24 and which receives a continuous carbon monoxide feed 26 at a pressure of 15 bars for 18 hrs.

Platinum carbonyl chloride is carried with carbon monoxide as a gaseous mixture 15 through conduit 14 to decomposer 16, wherein platinum metal from the decomposition of the platinum carbonyl chloride is deposited. Scrubber 16 chemically decomposes any remaining platinum carbonyl chloride in gaseous mixture 15 to provide effluent carbon monoxide 27. Decomposer 16 is maintained at a temperature of about 200° C.

A metallic residue 28 is produced in reactor 12 by the end of the process run

In an alternative embodiment, an anhydrous rhodium chloride and iridium chloride admixture is substituted for the platinum chloride/palladium chloride, admixture described hereinabove. The process, in this embodiment, produces metallic rhodium and leaves a metallic iridium residue.

Figure 2:
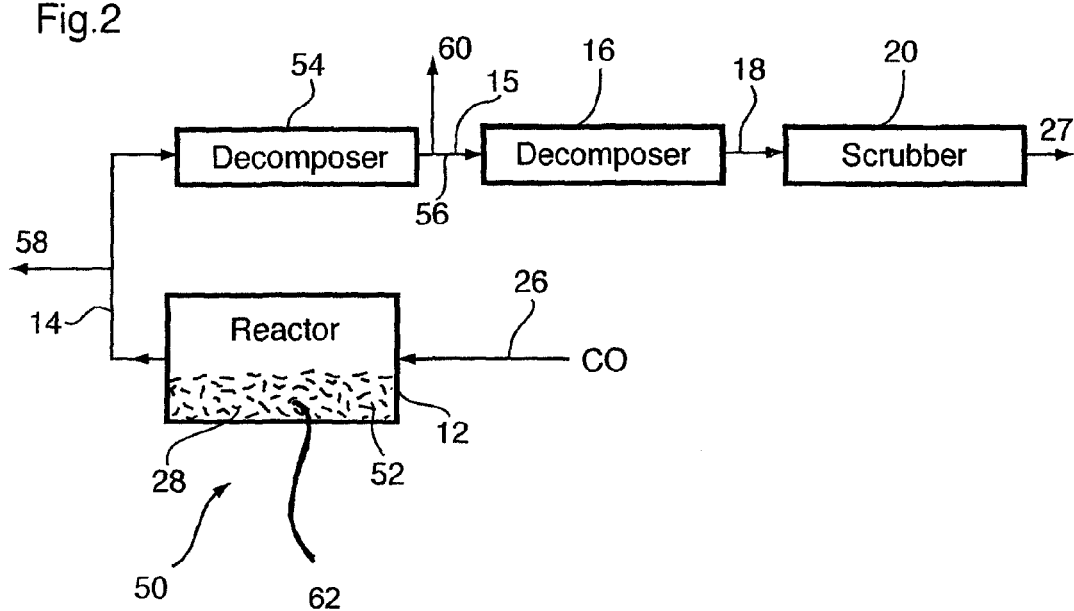
FIG. 2 is an alternative system to FIG. 1 apparatus and process according to the invention; and wherein the same numerals denote like parts.

FIG. 2 shows, generally as 50, an alternative embodiment used for the separation of a platinum chloride and rhodium chloride admixture 52 but with the apparatus of FIG. 1 having an additional tubular decomposer 54, formed of TEFLON® plastics material in direct communication with reactor 12. Decomposer 54 is connected by conduit 56 to stainless copper tube decomposer 16, which, itself, is connected to scrubber 20 by conduit 18.

In operation, the process conditions are as for the process described in respect of FIG. 1, except that TEFLON® perfluoroalkane plastic tube decomposer 54 only effects decomposition of platinum carbonyl chloride at 200° C. to produce purified metallic platinum. The gaseous mixture comprising rhodium carbonyl chloride in carbon monoxide carrier gas leaves decomposer 54 through conduit 56 to copper tube decomposer 16, wherein metallic rhodium is deposited by the decomposition of the rhodium carbonyl chloride at 200° C. It is believed that the copper tube surface acts as a chlorine scavenger to enhance decomposition not observed in inert plastics tube decomposer 54. Tubes formed of chlorine scavenging alternative plastics materials, such as PVC, also effect thermal decomposition of rhodium carbonyl chloride to metallic rhodium. Residue 62 comprises impure metallic platinum and rhodium.

In alternative embodiments, iron, particularly stainless steels may be used to decompose the PGM carbonyl halides.

By means of bleed side conduit 30, a gaseous mixture comprising (a) platinum carbonyl chloride or (b) rhodium carbonyl chloride, in carbon monoxide carrier gas may be removed in accordance with the aforesaid respective description.

By means of side conduit 58, a gaseous mixture of platinum carbonyl chloride and rhodium carbonyl chloride in carbon monoxide carrier gas may be removed.

By means of intermediate side conduit 60, a gaseous mixture of platinum carbonyl chloride with carbon monoxide may be removed from the system.

EXAMPLE 1

Extraction of Rhodium from Rhodium Chloride

Anhydrous $RhCl_3$ (194 mg) was charged into a thermo gravimetric analyzer (TGA) carbonyl reactor connected in series to, firstly, a copper tube decomposer and, secondly, to an ammonia solution scrubber.

$RhCl_3$ was reacted with a continuous flow of feed CO at a temperature of 130° C. and 10-bar pressure for a period of 5 hrs. The exhaust gas from the reactor containing $RhCOCl_3$ in spent CO gas passed through the copper tube decomposer at a temperature of 580° wherein Rh metal was deposited. Exit gas from the decomposer was passed through the ammonia scrubber.

After the completion of the 5 hr. test, the apparatus was purged with helium, cooled and opened for inspection. The copper decomposer was shown by XRF analysis to have a deposition of rhodium. The scrubber solution had not changed colour from its initial colour, which is indicative that there had been no chemical decomposition of residual carbonyl chloride.

The results of the TGA showed at 54% extraction of rhodium from the original amount of the rhodium species tested.

EXAMPLE 2

Example 1 was repeated but wherein the copper tube decomposer had three locations at temperatures of 185° C., 260° C. and 580° C. in series, respectively, with the lower temperature location receiving the reactor exhaust gas first and the higher temperature last. Each of the locations showed rhodium deposition, for a total deposition yield of about 70% of original rhodium species.

It was concluded that rhodium carbonyl chloride decomposition in the copper decomposer occurred at a minimum temperature of 180-200° C. under these test conditions.

EXAMPLE 3

Example 1 was repeated but with a TEFLON® fluorocarbon tube decomposer heated to 200° C. replacing the copper tube decomposer. In this test, however, there was no rhodium carbonyl chloride decomposition.

EXAMPLE 4

Example 1 was repeated but with a PVC tube decomposer heated to 200° C. replacing the TEFLON® tube. In this test, there was substantial rhodium carbonyl chloride decomposition.

EXAMPLE 5

A selective PGM extraction apparatus was set up comprising a PGM chloride carbonylation reactor connected in series, in the following order, with a TEFLON® plastic tube, a first copper tube followed by a second copper tube.

The reactor was charged with an anhydrous PGM chloride, with a $ZnCl_2$ impurity, mixture (1.91 g) having the following composition as determined by XRF to be 83.03 w/w % pt, 14.18 w/w % Pd, 2.38 w/w % Rh, 0.19 w/w % Zn.

Feed CO was passed continuously over the PGM mixture at a temperature of 120° C. and 1 bar for 18 hrs. and the spent gas passed through the above three composers at temperatures of 200° C., 200° C. and 400° C., respectively, PGM carbonyl chloride decomposition was observed in each of the tubes, as follows.

Platinum was deposited on the initial inner surface of the TEFLON® tube indicating a decomposition of platinum carbonyl chloride at a temperature lower than 200° C., and also in the first copper tube.

Rhodium was not deposited in the TEFLON® tube, but was deposited in the first copper tube maintained at 200° C.

Pd was not found in any of the three decomposers.

Analysis of the copper tube deposit showed 83.03 w/w % Pt, 0% Pd, and 27.31 w/w % Rh.

The residue remaining in the reactor was further treated at 350° C. and 30 bars for several extended period of time but no reaction was observed. The residue was metallic and it was concluded that reduction of the PGM chloride feed had occurred.

EXAMPLE 6

Example 5 was repeated at 130° C. and 1 bar pressure for 70 hrs. with a 1.0362 gm sample having the amounts of metal species before and after the extraction as follows.

| Feed (% w/w) | 82.6 Pd, | 14.18 Pt, | 2.45 Rh, | 0.16 Zn |
|---|---|---|---|---|
| Residue | 89.64 Pd, | 7.17 Pt, | 2.62 Rh, | 0.21 Zn |
| % PGM Extracted | 21% Pd, | 63% Pt, | 22% Th, | (4% Zn - Non-PGM) |

EXAMPLE 7

Example 5 was repeated but with a stainless steel decomposition tube replacing the copper tube. Decomposition of the platinum carbonyl chloride and the rhodium carbonyl chloride, but no deposited palladium metals was observed.

EXAMPLE 8

Example 5 was repeated but with a PGM mixture (500 mg) reacted with CO at 130° C. and 15 bars for 24 hrs. Extensive foaming of the ammonia solution was observed after 4-5 hrs.; indicative that the extraction and decomposition had been completed by that time.

XRF analysis of original PGM mixture, reactor residue and metal deposition values were as follows.

| | Wt, mg | Pd | Pt | Rh | Ir | Ni | Pd | Pt | Rh | Ir |
|---|---|---|---|---|---|---|---|---|---|---|
| Feed | 0.9904 | 0.00% | 0 | 60.75% | 38.77% | 0.00% | 0 | 0 | 0.601668 | 0.383978 |
| Residue | 0.53801 | 0.19% | 0 | 27.45% | 71.37% | 0.54% | 0.001022 | 0 | 0.147684 | 0.383978 |
| Extraction, mg | | | | | | | −0.001022 | 0 | 0.453984 | 0 |
| Extraction, % | | | | | | | | | | |

The results show the total separation of rhodium species from the iridium species.

EXAMPLE 9

No decomposition was observed in the TEFLON® and copper tube decomposers. It was found that the stainless steel because the line between the reactor and the first decomposer was less than 200° C., the rhodium carbonyl chloride sublimed in the line. Analysis of the line using XRF showed mainly rhodium on the stainless steel surface. There was no change of colour of the ammonium solution in the scrubber.

EXAMPLE 10

Example 9 was repeated with an anhydrous PGM mixture (500 mg) but wherein the line from the reader to the first decomposer were maintained at 130° C.

The mass balance values of this mainly rhodium and iridium species mixture were:

| | Wt, mg | Pd | Rh | Ir | Ni | Pd | Rh | Ir |
|---|---|---|---|---|---|---|---|---|
| Feed | 0.9055 | 0.00% | 66.52% | 32.94% | 0.17% | 0 | 0.602339 | 0.298272 |
| Residue | 0.4711 | 0.13% | 34.90% | 63.49% | | 0.000612 | 0.164414 | 0.299101 |
| Extraction, mg | | | | | | −0.000612 | 0.437925 | −0.00083 |
| Extraction, % | | | | | | | | |

The results show the total separation of rhodium species from the iridium species.

Although this disclosure has described and illustrated certain preferred embodiments of the invention, it is to be understood that the invention is not restricted to those particular embodiments. Rather, the invention includes all embodiments, which are functional or mechanical equivalence of the specific embodiments and features that have been described and illustrated.

The invention claimed is:

1. A process for the production of purified platinum and rhodium from an impure PGM source containing platinum and rhodium, said process comprising:
   (a) obtaining an anhydrous admixture comprising a platinum halide and a rhodium halide from said impure PGM source;
   (b) treating said platinum and rhodium halides with carbon monoxide at an effective temperature, pressure and time to form platinum and rhodium carbonyl halides as a gaseous mixture; and
   (i) heating said gaseous mixture at an effective platinum carbonyl halide decomposition temperature lower than a rhodium carbonyl halide effective decomposition temperature in the absence of a chlorine scavenger, to produce said purified platinum and a platinum carbonyl halide-depleted gas and, subsequently,
   (ii) heating said depleted gas at an effective rhodium carbonyl halide decomposition temperature in the presence of a chlorine scavenger to produce said purified rhodium.

2. A process as claimed in claim 1, wherein said halide is chloride.

3. A process as claimed in claim 1 wherein said impure PGM source further comprises an additional PGM selected from the group consisting of palladium and iridium.

4. A process as claimed in claim 3 wherein said anhydrous admixture further comprises an anhydrous additional PGM halide selected from the group consisting of palladium and iridium.

5. A process as claimed in claim 1, wherein the treating with carbon monoxide is performed at a temperature selected from 80-150° C., a pressure of at least 1 bar and for at least 1 hr.

6. A process as claimed in claim 5 wherein said temperature is selected from 120-140°, pressure selected from 1-18 bar and for 2-25 hrs.

7. A process as claimed in claim 1, wherein said scavenger is a metallic surface.

8. A process as claimed in claim 7 wherein said metallic surface comprises a copper or steel surface.

9. A process as claimed in claim 1, wherein said anhydrous admixture comprises a PGM chloride obtained by a process comprising dissolution of said PGM source in aqua regia.

10. A process of separating a rhodium species from an iridium species in a species mixture comprising said rhodium species and said iridium species, said process comprising:
   (a) obtaining an anhydrous admixture comprising a rhodium halide and an iridium halide from said species mixture;
   (b) treating said admixture with carbon monoxide at an effective temperature, pressure and time to produce a rhodium carbonyl halide and a residue; and
   (c) collecting said rhodium carbonyl halide.

11. A process as claimed in claim 10 further comprising heating said rhodium carbonyl halide at an effective rhodium decomposition temperature to produce metallic rhodium.

12. A process as claimed in claim 11 wherein said step of heating said rhodium carbonyl halide is effected in the presence of a chlorine scavenger.

13. A process of separating a platinum species and a rhodium species from a palladium species and an iridium species in a species mixture comprising said platinum, palladium, rhodium and iridium species, said process comprising:
   (a) obtaining an anhydrous admixture comprising a platinum halide, a palladium halide, a rhodium halide and an iridium halide from said species mixture;
   (b) treating said anhydrous halide mixture with carbon monoxide at an effective temperature, pressure and time to form a platinum carbonyl halide and rhodium carbonyl halide gaseous mixture; and
   (c) collecting said platinum carbonyl halide and said rhodium carbonyl halide gaseous mixture.

14. A process as claimed in claim 13 further comprising the steps of:
   (i) heating said gaseous mixture at an effective platinum carbonyl halide decomposition temperature, pressure and time, wherein said platinum decomposition temperature is lower than rhodium carbonyl halide decomposition temperature to produce metallic platinum and a platinum-depleted gaseous mixture; and
   (ii) subsequently heating said platinum-depleted gaseous mixture at an effective rhodium carbonyl halide decomposition temperature, pressure and time to produce metallic rhodium.

15. A process as claimed in claim 14 wherein step (ii) is effected in the presence of a chlorine scavenger.

* * * * *